Patented Jan. 13, 1953

2,625,567

UNITED STATES PATENT OFFICE 2,625,567

1-BENZYLOXY-2-ALKYLAMINOINDANES

Richard V. Heinzelmann, Kalamazoo, Mich., assignor to The Upjohn Company, Kalamazoo, Mich., a corporation of Michigan No Drawing. Application August 10, 1950,
Serial No. 178,759

5 Claims. (Cl. 260—571)

The present invention relates to a novel series of compounds having marked bronchodilator activity, which may be represented by the following formula:

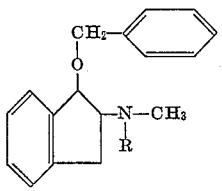

wherein R is hydrogen or methyl, and acid addition salts thereof.

Members of the new class of compounds described herein have been prepared and physical properties thereof determined whereby they can be identified. The salts are well defined crystalline compounds which are generally soluble in water and alcohol and substantially insoluble in ether, benzene, carbon tetrachloride, and ethyl acetate. The free amines are generally viscous oils which are soluble in the common organic solvents and are best purified either by distillation under reduced pressure or by crystallization of their acid addition salts. The new compounds are of value for their effects in the relaxation of constricted bronchi and in altering the blood pressure.

The amines of the present invention can be prepared by heating the appropriate alkylamine with 1-benzyloxy-2-bromoindane at an elevated temperature for several hours. The resulting alkylaminoindane ether can be conveniently isolated by removing the solvent and any unreacted amine under reduced pressure, dissolving the residue in benzene, diethyl ether, or any other suitable organic solvent, decolorizing the organic extract, evaporating the solvent and distilling under reduced pressure.

Salts of the amnies of this invention can be formed by the addition of an appropriate acid to a solution of the amine in an anhydrous solvent. The amine salt can be isolated by evaporation of the solvent or crystallization from its solution. The amine used for the preparation of its salts can be that purified by distillation, or preferably the anhydrous, decolorized solution obtained from the reaction mixture as described above. Suitable acids for the preparation of salts are hydrochloric, hydrobromic, sulfuric, phosphoric, benzoic, propionic, succinic, citric and other similar metal free inorganic and organic acids. The salts thus obtained are insoluble in most anhydrous organic solvents, but they can be conveniently purified by crystallization from anhydrous ethanol or mixtures of anhydrous ethanol with ether, ethyl acetate, benzene or the like.

1-benzyloxy-2-bromoindane can be prepared by heating a mixture of indenedibromide and benzyl alcohol at about 100 degrees centigrade for about three hours while adding one equivalent of pyridine at a substantially uniform rate. The resulting bromo ether can be purified by pouring the mixture into water separating the organic layer and distilling it under reduced pressure.

Although an alkylamine will react with 1-benzyloxy-2-bromo-indane to produce a 2-alkylamino-1-benzyloxyindane within a temperature range of about 100 to 150 degrees centigrade, it is preferred to operate at about 115 degrees centigrade, at which temperature a reaction time of about 20 hours is most satisfactory.

Certain advantages of the invention are apparent from the following examples which are given by way of illustration only and are not to be construed as limiting.

*Example 1.—1-benzyloxy-2-methylaminoindane and hydrochloride*

A mixture of 15.4 grams of methylamine in 40 milliliters of benzene and nine grams of 1-benzyloxy-2-bromoindane was heated under pressure at 110 to 120 degrees centigrade for twenty hours. The reaction mixture was then cooled, filtered to remove the methylamine hydrobromide formed in the course of the reaction, and heated at about 100 degrees to remove the excess methylamine and benzene. The residual 1-benzyloxy-2-methylaminoindane was dissolved in about fifty milliliters of diethyl ether, decolorized with activated carbon, and mixed with an ethereal solution of anhydrous hydrogen chloride to form the amine hydrochloride. The crystalline hydrochloride was filtered off and recrystallized from absolute alcohol to obtain 1.66 grams of 1-benzyloxy - 2 - methylaminoindane hydrochloride which melted at 190 to 191 degrees centigrade.

*Example 2.—1-benzyloxy-2-dimethylaminoindane and hydrochloride*

A mixture of sixty grams of dimethylamine in 125 milliliters of benzene and forty grams of 1-benzyloxy-2-bromoindane was heated under pressure at 125 to 130 degrees centigrade fifteen hours. The reaction mixture was cooled, filtered to remove the dimethylamine hydrobromide formed in the reaction and heated at about 100 degrees centigrade to remove the benzene and excess dimethylamine. The residue was dissolved in 150 milliliters of ether and mixed with an ethereal solution of anhydrous hydrogen chloride to form the amine hydrochloride. The amine hydrochloride which separated as a red-black gum was dissolved in 150 milliliters of alcohol and decolorized with eight 1 gram portions of activated carbon. The alcohol was removed by evaporation, the residue dissolved in 150 milliliters of water, the aqueous extract made alkaline with sodium carbonate and 1-benzyloxy-2-dimethylaminoindane extracted with an equal volume of ether. The ethereal extract was then dried and mixed with an etheral solution of anhydrous hydrogen chloride whereupon the amine hydrochloride precipitated in the form of white crystals. Upon recrystallization of the amine hydrochloride from absolute alcohol 1-benzyloxy-2-dimethylaminoindane hydrochloride was obtained which melted at 166 to 167 degrees centigrade.

It is to be understood that this invention is not to be limited to the exact method and compositions hereinbefore described, since obvious modifications will occur to a person skilled in the art in accordance with the principles declared herein.

I claim:

1. A member of the group consisting of benzyloxy-alkylaminoindanes having the formula:

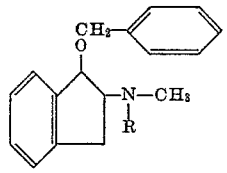

wherein R is a member of the group consisting of hydrogen and methyl, and acid addition salts thereof.

2. 1-benzyloxy - 2 - methylaminoindane hydrochloride.

3. 1 - benzyloxy - 2 - dimethylaminoindane hydrochloride.

4. 1-benzyloxy-2-methylaminoindane.

5. 1-benzyloxy-2-dimethylaminoindane.

RICHARD V. HEINZELMANN.

REFERENCES CITED

The following references are of record in the file of this patent:

Braun et al.: Berichte, vol. 63B, pp. 3052–3059 (1930).